United States Patent [19]

Eigenbrode et al.

[11] Patent Number: 5,577,381
[45] Date of Patent: Nov. 26, 1996

[54] EXHAUST NOZZLE COOLING SCHEME FOR GAS TURBINE ENGINE

[75] Inventors: Daniel E. Eigenbrode, Hobe Sound; Erik A. Lindstrom, Palm Beach Gardens, both of Fla.

[73] Assignee: United Technologies Corporation, Hartford, Conn.

[21] Appl. No.: 349,846

[22] Filed: Dec. 6, 1994

[51] Int. Cl.[6] ............................ F02K 1/82; F02K 3/04
[52] U.S. Cl. ...................... 60/226.1; 60/266; 239/127.3
[58] Field of Search ............................ 60/39.07, 39.83, 60/226.1, 226.3, 266, 271; 239/127.1, 127.3

[56] References Cited

U.S. PATENT DOCUMENTS

| | | | |
|---|---|---|---|
| 4,544,098 | 10/1985 | Warburton | 239/127.3 |
| 5,101,624 | 4/1992 | Nash et al. | 60/266 |
| 5,255,849 | 10/1993 | Mayer et al. | 60/266 |
| 5,307,624 | 5/1994 | Even-Nur et al. | 60/226.3 |

*Primary Examiner*—Louis J. Casaregola
*Attorney, Agent, or Firm*—Norman Friedland

[57] ABSTRACT

Cooling of the hot surfaces of the exhaust nozzle of a fan jet engine and purging of the nacelle is attained by a booster pump mounted in exhaust nozzle structure and the booster pump having an ejector driven by localized fan air existing in the engine cooling path extracted from the fan of the engine for pumping nacelle air and mixing the egressing fluid in a mixing chamber and diffuser disposed in fluid communication with booster pump which is then dumped into a plenum within the exhaust nozzle structure for feeding film cooling holes formed in the hot surfaces for laying a blanket of cooling air along the gas path surface of the exhaust nozzle.

3 Claims, 4 Drawing Sheets

EXHAUST NOZZLE COOLING SCHEME FOR GAS TURBINE ENGINE

CROSS REFERENCE

This patent application relates to the following patent applications filed on even date and all of which are commonly assigned to United Technologies Corporation:

"Nacelle Air Pump for Vector Nozzles for Aircraft" invented by Mark Stefan Maier, Eric Joseph Gamble, Jack Wilcox Wilson, Eliott Luis Calzadilla and Gerald Frederick Goetz, Blind Assembly-Swivel Crossover Tube" invented by Mark Stefan Maier, and "Aircraft Nacelle Ventilation and Engine Exhaust Nozzle Cooling" invented by Douglas A. Tornebe and Russell L. Coons.

TECHNICAL FIELD

This invention relates to a cooling and ventilation scheme for the exhaust nozzle of a gas turbine engine and the aircraft nacelle and particularly to a cooling scheme employing an ejector pump driven by the discharge air from the engine's fan that is used for other cooling purposes and is already available internally of the engine.

BACKGROUND ART

In recent years military aircraft, particularly those in the fighting class are outfitted with exhaust nozzles with enhanced capabilities. Inasmuch as the nozzles are subjected to extremely high temperatures, it is necessary to provide means for cooling the components in order to maintain their structural integrity. It is, of course, necessary that the use of cooling air be such as to not adversely impact the performance of the engine as by utilizing air that would otherwise be used for generating thrust. At the very least this use of this air should be held to a minimum and keep the performance deficit to a minimum. Such cooling systems also should be as light and as simple as possible for reasons of aircraft pay loads, engine operating performances and for aircraft and engine maintainability.

As one skilled in the aircraft and engine technology knows, it is abundantly important to cool the airframe and engine components that are disposed in the hot section adjacent the engine's exhaust nozzle. One method of cooling is by utilizing ejector nozzles to pump low energy ram air into the divergent section and film cool the hot nozzle components. While this system provides the lowest possible cooling air temperature it also provides the lowest possible cooling air pressure or cooling system outflow, therefore increasing maintenance and their attendant costs and inducing significant risk to the operation of the overall weapon system.

One solution to the problem noted in the above paragraph is utilizing interstage fan bleed air as a nozzle cooling air source. Interstage fan bleed air is available on turbo-fan engines that include multi-stages of fan rotors. A comparison of the temperature/pressure profile of the fan air at various stations in the multi-stages is demonstrated in FIG. 4 which is a plot of coolant temperature vs. coolant total pressure and the static pressure of the gas path adjacent the discharge of the coolant into the gas path. As noted, curve X shows that the coolant temperature and total pressure of the engine cycle air increases as it is bled closest to the fan discharge air. Obviously, this flow must be ducted directly to the exhaust nozzle in order to attain these values. This entails the necessity of ducting this air externally of the engine through external conduits. This would require that the basic engine configuration be changed in order to accommodate this cooling technique and would require large ducting to accommodate the air flow volume from the fan to the nozzle which would significantly add to the overall engine weight. And, additionally, this would have negative fan operability impacts.

It is also abundantly important to prevent gasses escaping from the aircraft engine from migrating into the nacelle and accumulating to the point where the gasses would combust and either cause fires or explosions. It is customary to purge the nacelle so as to avoid such occurrences. Current techniques for purging the nacelle is to locate a pump adjacent to the exhaust nozzle and pump the ram air that is contained in the nacelle through exhaust ports located at the tail end of the aircraft. Obviously, this entails pressurizing the stagnated gasses to assure that the proper exhaust flow is maintained throughout the operating envelope of the aircraft. The increase in pressure requires larger pumping apparatus resulting in heavier support structure that is necessary to attain the structural integrity of the engine parts which increases overall engine weight and hence, incurs an engine operating performance deficit.

One type of pump heretofore utilized for this purpose is an ejector pump that utilizes fan discharge air as the primary fluid and dumps the entrained nacelle air directly overboard. The use of fan air for this purpose and in this manner penalizes engine performance as the fan air would otherwise be used for generating thrust.

It is also important in this technology to pump nacelle cooling air at flow rates and pressures sufficient to be injected into the nozzle gaspath flow for sidewall cooling. Typically, one of two sources have heretofore been utilized for sidewall cooling. One of the sources is the fan air which has sufficiently high driving pressures but is at relatively high temperatures which results in poor cooling and as mentioned above comes at the expense of engine performance. The other source is the ambient air that is entrained in the nacelle which has sufficiently low temperatures that would provide efficient cooling, but its pressure is too low for it to penetrate into the engine's gas path and flow therein.

We have found that we can obtain sufficient cooling at the required coolant pressures by including boost pumps disposed locally relative to the exhaust nozzle. This is demonstrated in FIG. 4 where curve Y illustrates the boost air which is sufficiently cool and at sufficient pressure to be injected into the gas path. The boost pumps are ejector pumps that are powered by locally available fan air that is otherwise used for cooling purposes in the engine. In addition, by virtue of this invention this cooling system would provide sufficient nacelle ventilation which would eliminate the customary ventilation system that are typically provided in these types of aircraft.

SUMMARY OF THE INVENTION

An object of this invention is to provide an improved exhaust nozzle cooling system that is characterized as providing the following advantages:

1) It minimizes ducting and weight increase since fan discharge and nacelle air are available near the nozzle regions being cooled;

2) It minimizes impact on fan operation, engine configuration and controls;

3) It has versatility in that it can be incorporated in current as well as future engine/nozzle concepts;

4) It eliminates or reduces airframe mounted nacelle ventilation systems;

4) It enhances thrust by injecting the nacelle air into the engine's exhaust stream;

5) It improves durability of the surfaces of the components adjacent the exhaust gas stream which lower maintenance costs; and 6) Where observables are a consideration, it improves radar and infrared signatures due to reduction in visible exits and exhaust system surface temperatures.

A feature of this invention is the inclusion of an ejector boost pump that is powered by available local fan discharge air for boosting the pressure of the available nacelle-bay air.

The foregoing and other features of the present invention will become more apparent from the following description and accompanying drawings.

BEST MODE FOR CARRYING OUT THE INVENTION

While this invention is utilized in a twin spool turbo fan engine with a non axisymmetric exhaust nozzle aircraft installation, as one skilled in this art will appreciate, this invention can be employed with other types of engine/aircraft installations where fan air and nacelle air are locally available.

Figure 1:
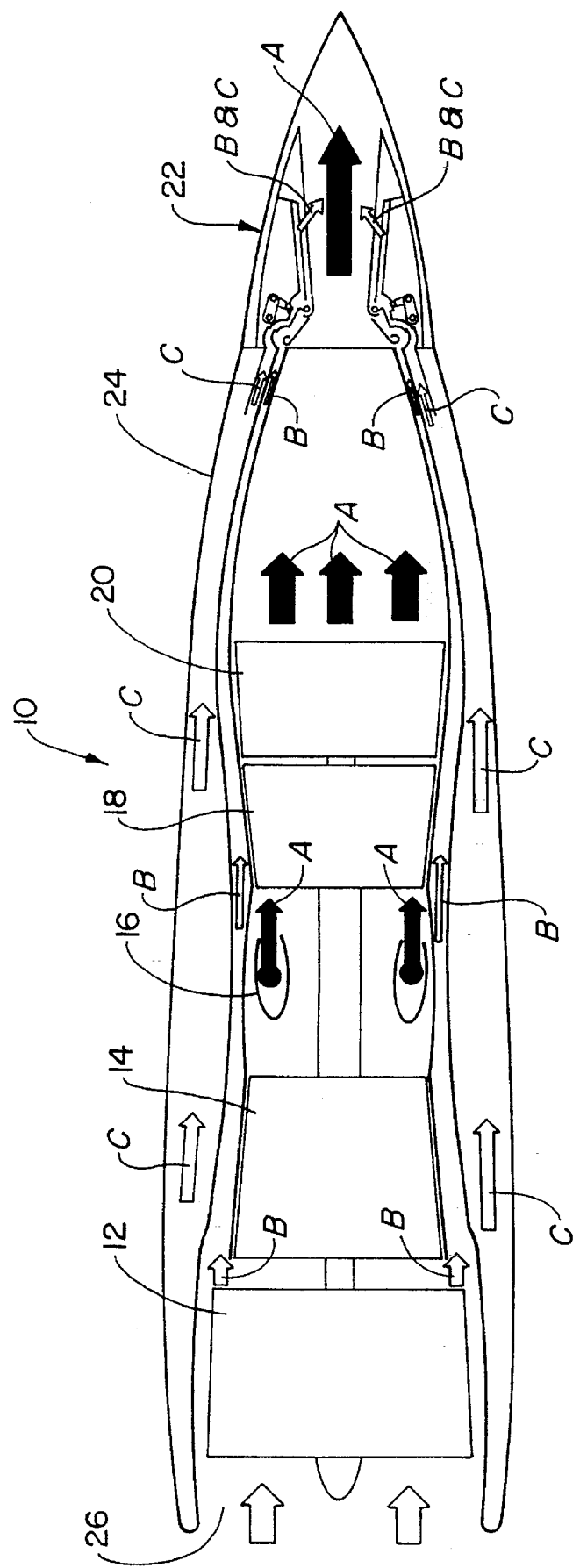
FIG. 1 is a schematic illustration of the gas turbine engine with an exhaust nozzle mounted in a nacelle of aircraft and illustrates the flow of fan discharge air and nacelle air.

Referring to FIG. 1 which is a schematic illustration of the gas turbine engine installed in a nacelle for illustrating the flow path of the air being used by this invention, where the fluid working medium is represented by reference letter A, the fan discharge air is represented by reference letter B and the nacelle or ambient air is represented by reference letter C. As shown in FIG. 1, the gas turbine engine is a twin spool axial flow engine generally illustrated by reference numeral 10 comprising a fan/compressor section 12, a high pressure compressor section 14, the combustion section 16, the high pressure turbine section 18, the low pressure turbine section 20 and the exhaust nozzle 22. As schematically shown the engine is installed in the nacelle 24. As is well known the engine develops thrust by ingesting air at the inlet 26 where a portion flows through the fan of the fan/compressor 12 and the remaining portion flows through the compressor section of fan/compressor 12. The fan serves to accelerate the air to produce thrust while a portion of that air is bled from the fan discharge to cool certain components of the engine, as will be more fully described hereinbelow.

The air flowing through the compressor of the fan/compressor 12 is next admitted to the high compressor section 14 where it is further pressurized and accelerated. This air is then delivered to the engine's combustion section 16 where it mixes with fuel and combusts to increase the velocity and temperature of the air. The high temperature gasses serve to power the high pressure turbines 18 and low pressure turbines 20 which, in turn, drive the compressor/fan 12 and high pressure compressors 14. The energy that isn't absorbed by the turbines serves to develop thrust for powering the aircraft, which thrust is enhanced by virtue of the exhaust nozzles 22.

The nacelle includes cavities and flow passages where ambient air is admitted internally through engine inlet 26 and is discharged from the nacelle as will be described in more detail hereinbelow.

Figure 2:
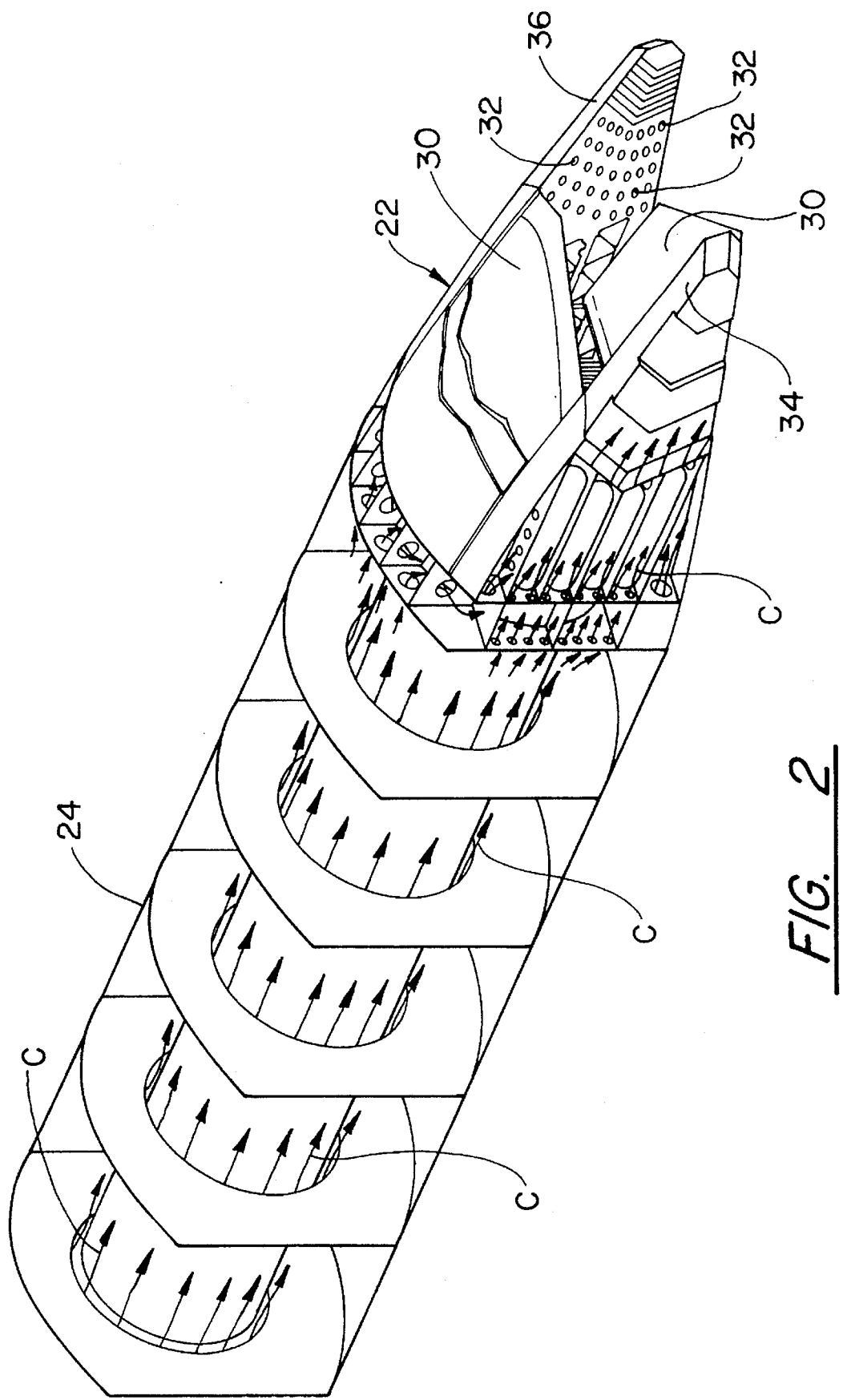
FIG. 2 is a schematic of the engine and particularly of the exhaust nozzle and illustrating the flow path of the coolant.
Figure 3:
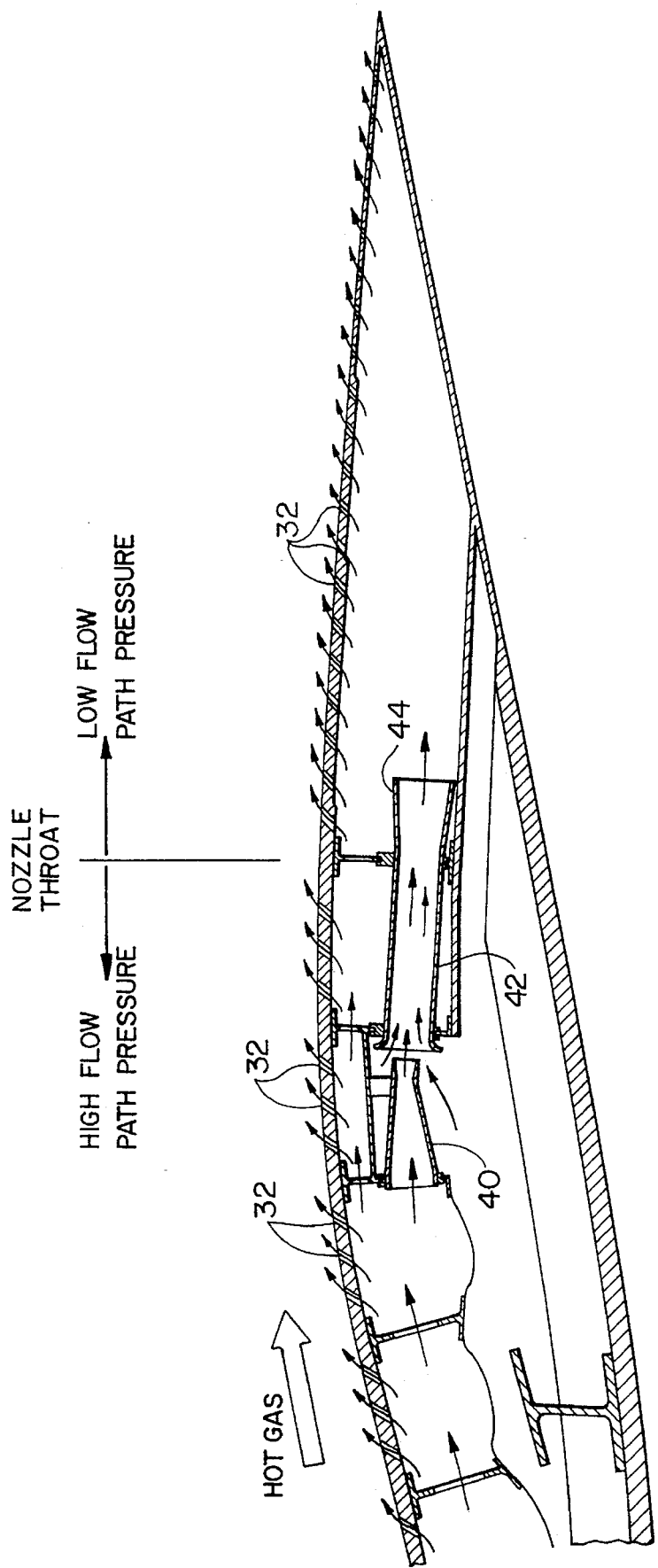
FIG. 3 is a schematic view in section illustrating the details of this invention.
Figure 4:
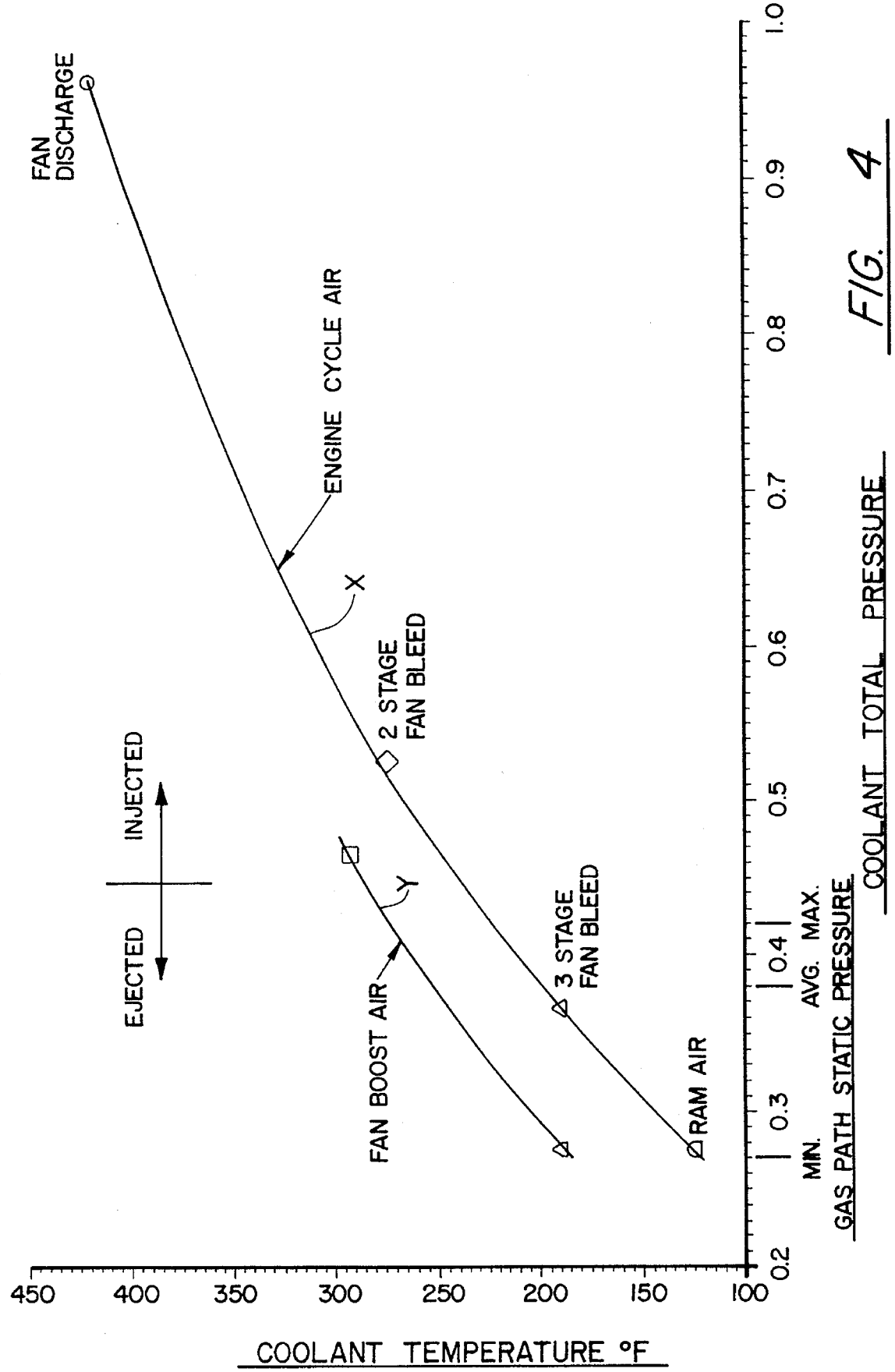
FIG. 4 is a graph illustrating a plot of the coolant temperature and coolant pressure available in a particular turbo fan engine configuration.

The distribution of the nacelle air used to cool the exhaust nozzle and flow stream for venting the nacelle is schematically illustrated in FIG. 2 which show the nacelle air C being conducted to the exhaust nozzle 22. It will be understood by those skilled in this art that the pressure of this air is at a relatively low value and as mentioned earlier this is the coolest air in the system, but the pressure is not sufficient to provide effective cooling outflow. This air is eventually conducted to the exhaust nozzle 22 for cooling the hot surfaces 34, 36 and 30 and discharged through film cooling holes 32. Since the exhaust nozzle is not a part of this invention for the sake of convenience and simplicity a detailed description is omitted herefrom, but for further details reference is made to U.S. Pat. No. 4,690,329 granted on Sep. 1, 1987 to W. M. Madden and assigned to United Technologies Corporation, the assignee common to the assignee of this patent application and incorporated herein by reference.

In the existing nozzle configuration the fan air is ducted to the nozzle and is discharged through a plurality of film air cooling holes 32 extending vertically and axially along the surface of the surface of the side walls 34 and 36 and flaps 30 exposed to the exhaust gasses of the engine. In accordance with this invention this existing fan air is utilized to pressurize the nacelle air in the vicinity of the flaps 30 to enhance cooling and venting. A portion of the fan air is utilized to drive the ejector pump 40 which serve to pressurize the secondary flow consisting of the nacelle flow which is induced therein through cut-outs formed in the nozzle duct structure. The ejector pump 40 conducts the mixed fan air and nozzle air, which is at a higher pressure than the nozzle air and cooler than the fan air, to the mixing chamber 42 and the diffuser 44 and then into the cavity 46 for feeding the film air cooling holes 32. The diffuser assures that the static pressure of the mixed flow is at a level to inject the flow through film cooling holes 32.

By virtue of this invention and the use of cut-outs in the nozzle duct structure a savings in weight and volume can be realized. Additionally this system matches the pressure and temperatures of systems that utilize interstage fan bleed air while eliminating the external ducting that would lead to a more complex and heavier system.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. For aircraft having a nacelle and being powered by a gas turbine engine disposed in said nacelle, said engine having a fan and an exhaust nozzle, said aircraft having liner means having hot surfaces defining a boundary for the gas path of the exhaust nozzle, passage means in said engine for conduction fan air to various components in said engine, means for cooling said liner means including at least one ejector pump mounted in one of said hot surfaces, said ejector pump for pumping nacelle air located in a cavity formed adjacent to said ejector pump, a mixing chamber in said exhaust nozzle in fluid flow relationship with said ejector pump for mixing the fan air and the nacelle air, and a cooling plenum defined by said liner means for accepting the mixed fan air and nacelle air so that said mixed fan air and nacelle air flows through film cooling holes formed in said hot surfaces exposed to said gas path, and said ejector pump in fluid communication with said passage means for utilizing the fan air that is local to said ejector pump, and a diffuser in fluid flow relationship with said mixing means.

2. For aircraft having a nacelle and being powered by a gas turbine engine disposed in said nacelle as claimed in claim 1 wherein said exhaust nozzle includes a throat section, said diffuser having a discharge end and said discharge end being disposed downstream of said throat relative to the flow the gas path.

3. For aircraft having a nacelle and being powered by a gas turbine engine disposed in said nacelle as claimed in claim 2 wherein said mixing means and said diffuser are integrally configured.

\* \* \* \* \*